US007126623B2

(12) United States Patent
Yen

(10) Patent No.: US 7,126,623 B2
(45) Date of Patent: Oct. 24, 2006

(54) SERIALLY CONNECTED LED LAMPS CONTROL DEVICE

(75) Inventor: George Yen, Chungho (TW)

(73) Assignee: Star-Reach Corporation, Taipei Hsien (TW)

( * ) Notice: Subject to any disclaimer, the term of this patent is extended or adjusted under 35 U.S.C. 154(b) by 0 days.

(21) Appl. No.: 11/011,149

(22) Filed: Dec. 15, 2004

(65) Prior Publication Data

US 2006/0125425 A1 Jun. 15, 2006

(51) Int. Cl.
*H04N 1/407* (2006.01)

(52) U.S. Cl. ...................... 347/237; 347/183; 347/232; 347/247; 347/184; 315/312

(58) Field of Classification Search ................ 315/312; 395/109, 101; 346/107 R; 347/237, 232, 347/183–184, 253
See application file for complete search history.

(56) References Cited

U.S. PATENT DOCUMENTS 5,253,934 A * 10/1993 Potucek et al. ............. 347/237
5,809,216 A * 9/1998 Ng ............................. 358/1.9
6,529,229 B1 * 3/2003 Nagumo ..................... 347/237

* cited by examiner

*Primary Examiner*—Tho Phan
*Assistant Examiner*—Chuc Tran
(74) *Attorney, Agent, or Firm*—Troxell Law Office, PLLC

(57) ABSTRACT

The present invention discloses a serially connected LED lamps control circuit device, which is applicable for an integrated circuit and has the following three features: using a buffer circuit to increase the DATA and Clock lines to extend the distance between a plurality of serially connected devices, delaying half cycle of the timing of the DATA line to enhance overall system stability, and adding an internal latch signal generate circuit to simplify the requirements for external connections.

1 Claim, 3 Drawing Sheets

SERIALLY CONNECTED LED LAMPS CONTROL DEVICE

FIELD OF THE INVENTION

The present invention relates to a serially connected LED lamps control circuit device, which is applicable for an integrated circuit and characterized in its using a buffer circuit to increase the DATA and Clock lines to extend the distance between a plurality of serially connected devices, delaying the half cycle of the timing of the DATA line to enhance overall system stability, and adding an internal latch signal generated circuit to simplify the requirements for external connections.

BACKGROUND OF THE INVENTION

The application of LED becomes popular, and the progress of LED brightness also promotes an extensive use of LEDs. Based on years of experience on research, development and selling of the LED products, the inventor of the present invention has developed a control device for improving system stability as well as greatly simplifying the system wiring.

The design of serially connected LED lamp control device is mainly applied for the occasion of connecting a series of LED lamps, and each LED lamp is controlled effectively and independently.

Three traditional methods for controlling the serially connected LED lamps are described as follows:

The first design uses a control box to control all lamps and an electric cable to connect each of the LED lamps. The cost for such method is lower; however, if the lamps are farther apart from each other or evenly distributed or arranged, then the cost of the electric cable is very high. Furthermore, since the length for each cable is not the same, which will cause tremendous difficulty for mass production and installation. Therefore, this design was adopted only at its early stage, but is seldom used thereafter because of its disadvantages.

The second design refers to a fixed address serial connection, of which a control circuit is installed in each lamp and a fixed address ID is assigned to each lamp, such that the system can operate as long as the power supply and the signal line are connected. Such system is simpler, but it has several drawbacks. Since each lamp requires a controller, therefore the cost is higher. In addition, each lamp requires a different ID, and thus making the manufacturing more difficult. Furthermore, it is necessary to change the ID of the spare parts for repair and maintenance purposes, thus causing some troubles.

The third design adopts a serially connected control circuit, which subdivides the controller as described in the abovementioned system and installs some part of the circuit in the lamp, and then all lamps are serially connected by an electric cable. Therefore, each time is seemingly identical and thus this design can simplify the level of difficulty for wiring, installing and maintaining the whole system.

Please refer to FIG. 7 for the block diagram of the foregoing third connection method. There are only 5 lamps 101*a*~101*e* shown in the figure, and a minimal quantity of signal wires 102, 103 is required for the system, which includes a total of six lines such as a DAT, a Clock (CLK), a latch signal (STB), an output enable (OE) for controlling the brightness, a power supply (VDD) and a ground (GND) lines. Each lamp unit 101*a*~101*e* uses the same line to connect the signal 103. Please refer to FIG. 8 for the internal structure of the lamp units 101*a*~101*e* as depicted in FIG. 7, which comprises 4 sets of circuits for description. In actual practice, the number of circuits depends on the actual need. In FIG. 8, the signal group 210 is an input end, and the signal group 211 is an input end of another signal, and four sets of D-type latches 203*a*~203*d* constitute a set of S-R shift registers and are driven by the external clock signal CLKI to save the external data DATI into the latches 203*a*~203*d* in the proper order. In the meantime, the internal data are sent to the next lamp through another data line DATO. After the data is shifted to a fixed address, the external latch signal STB 1 will be outputted from four sets of D-type latches 203*a*~203*d* to another set of D-type latches 203*a*~202*d* and then sent to the LED driver circuit 201 to drive the external LEDs 213*a*~213*c*. The buffers 204, 205, 206, 207 act as the buffers for the output of the CLK signal and data, the output of DATO latch signal, the output of STBO and the brightness output OEO respectively. The four connected signals DAT, CLK, STB and OE are the minimum requirement for such system. If there is an additional required function, the quantity of connecting wires will be increased. In view of the design that subdivides the central circuit to each lamp, the level of its originality is not high.

Since the method adopted by the foregoing method requires the connection of many circuits, and the lengths of the external connecting cables are different, and different lots of ICs have a slight difference such that the signal transmission error may occur easily (which will be illustrated by FIGS. 4 to 6), therefore the inventor of the present invention based on years of experience on designing and manufacturing similar system to invent and develop the control device in accordance with the invention to greatly improve the overall system stability as well as greatly reduce the required number of circuit connections.

SUMMARY OF THE INVENTION

Therefore, the primary objective of the present invention is to provide a serially connected LED lamps control circuit device, which is applicable for an integrated circuit and has the following three features: using a buffer circuit to increase the DATA and Clock lines to extend the distance between a plurality of serially connected devices, delaying the half cycle of the timing of the DATA line to enhance overall system stability, and adding an internal latch signal generated circuit to simplify the requirements for external connections.

DETAILED DESCRIPTION OF THE PREFERRED EMBODIMENTS

Figure 1:
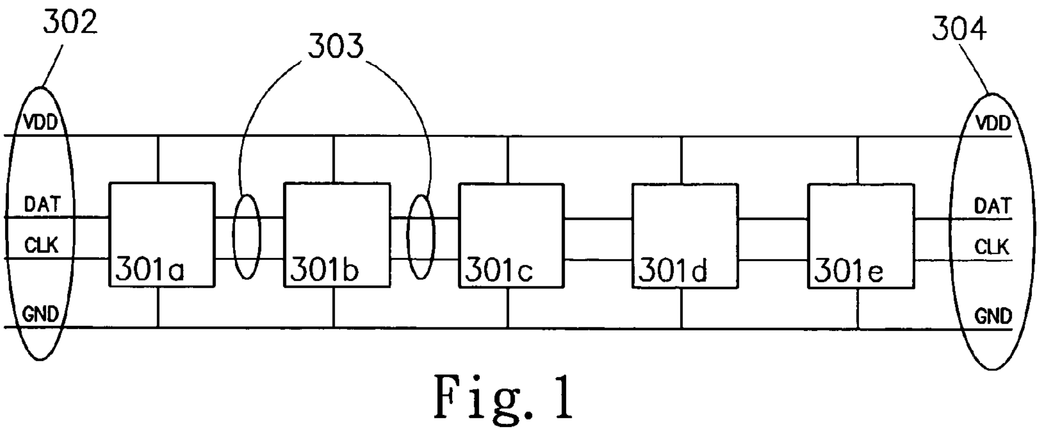
FIG. 1 is a block diagram of the method for connecting the LEDs according to the present invention.

Please refer to FIG. 1 for the block diagram of the method for connecting the LEDs according to the present invention. In FIG. 1, the whole circuit device only requires two signal lines: CLK and DAT in addition to the power supply VDD and ground GND. There are five lamp units 301*a*~301*e*, an input end 302, and an output end 303. The device is very simple and neat, which consists only four circuits between all lamps.

Figure 2:
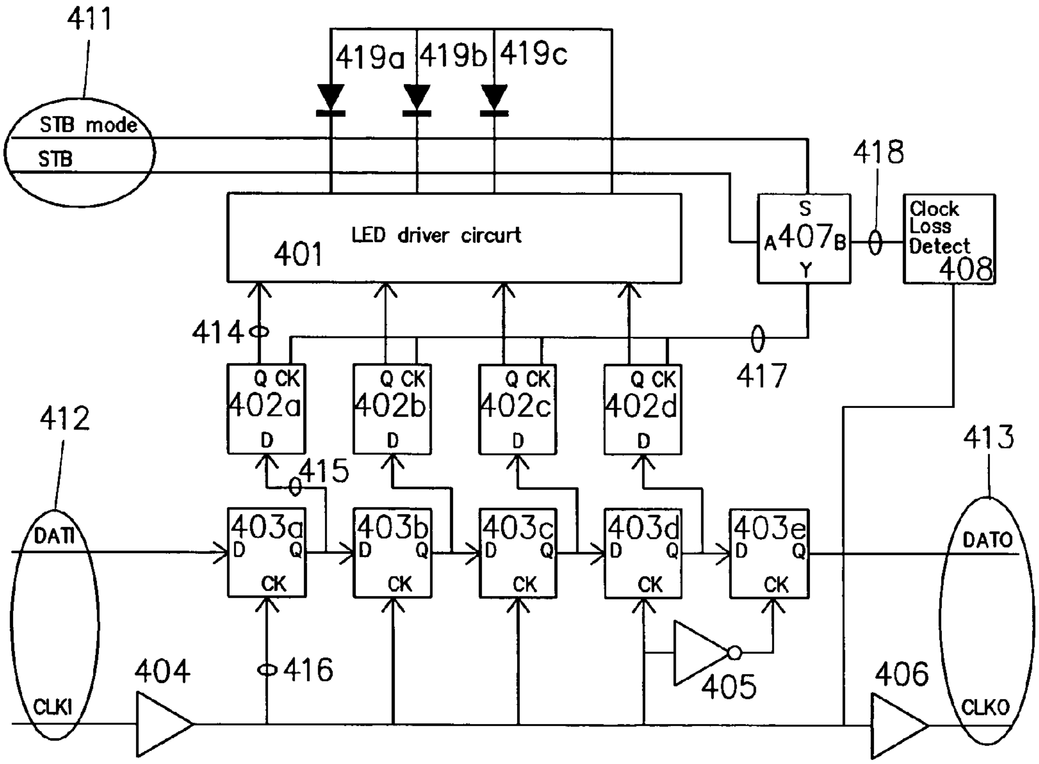
FIG. 2 is a structural diagram of the present invention.
Figure 3:
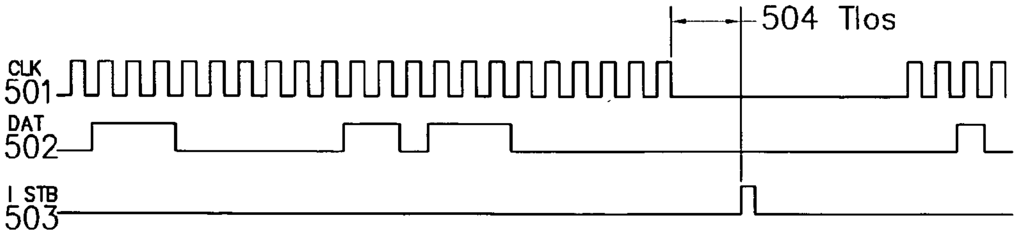
FIG. 3 is a timing diagram of the present invention.
Figure 8:
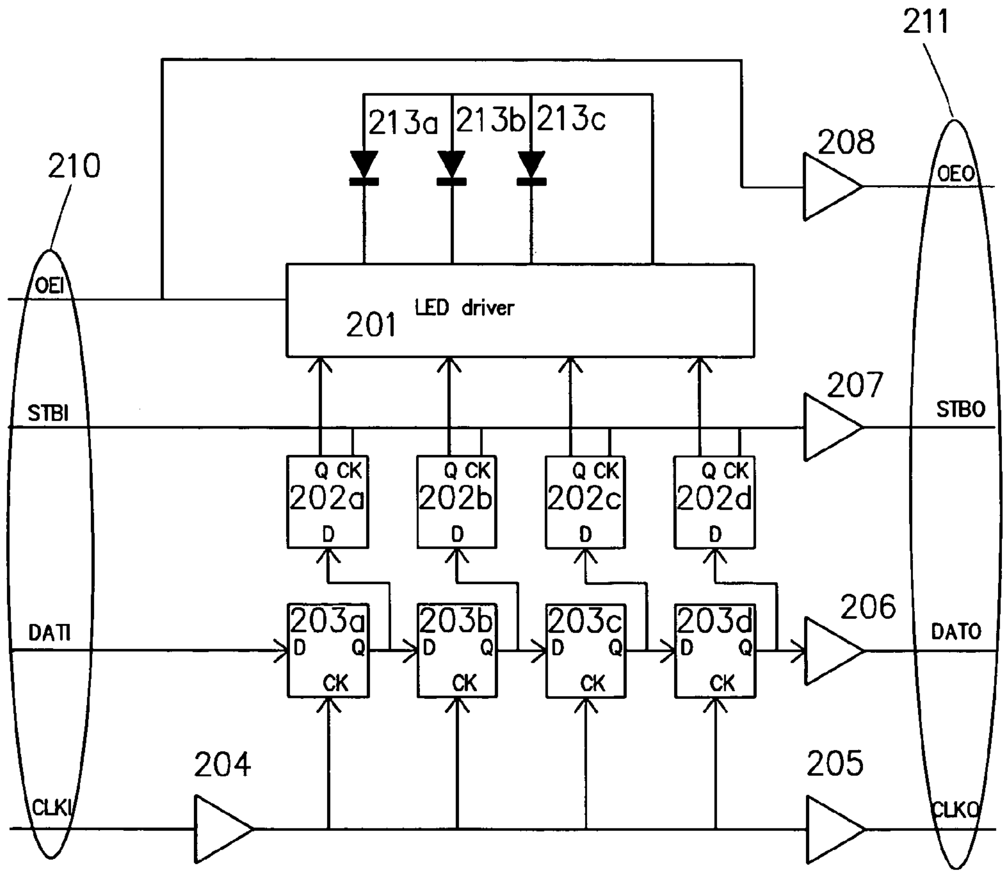
Prior Art Fig. 8
FIG. 8 is a structural diagram of the LED lamp unit as depicted in FIG. 7 according to the prior art.

FIG. 2 illustrates the structure of the present invention. There are two differences from the traditional structure as depicted in FIG. 8, such as a D-type latch 403*e* is installed in front of the data output DATO for the inverted clock synchronization, which can delay the data for half a cycle; and a clock loss detect circuit 408 is added. If a data DATI and the clock 502 as shown in FIG. 3 are sent, the clock CLKI and the clock 501 as shown in FIG. 3 will stop for a while, and then TIos 504 as shown in FIG. 3 and the circuit 408 will automatically generate a latch signal 418, and a latch signal 417 is obtained from the latch signal selector 407 and sent to another set of D-type latches 402*a*~402*d* to latch the output data 415 of the original S-R shift register 403*a*~403*d* to generate an LED control signal 414, and then the LED driver circuit 401 drives the LEDs 419*a*~419*c*. Therefore, a connecting line STB can be reduced. The latch signal select circuit 407 is added to provide circuit flexibility, and a system designer can select to use an internal or an external latch signal, and such choice is controlled by mode wire connection STB mod411, which is not essential to the present invention.

The clock buffers 404, 405 as shown in FIG. 2 has the same functions as those as shown in FIG. 8.

The timing diagram as shown in FIG. 3 illustrates the operating principle of the clock detect circuit 408 as shown in FIG. 2. In general, the timing of the TIos is preferably 20 µs~100 µs, but such values are not limited to these settings depending on different designs of the whole system.

Figure 4:
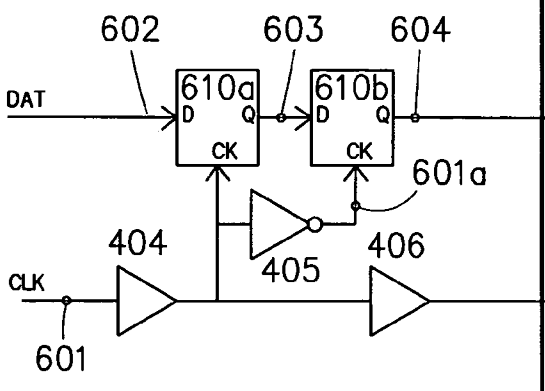
FIG. 4 is an illustrative diagram of the principle of delaying the data for a half cycle according to the present invention.
Figure 5:
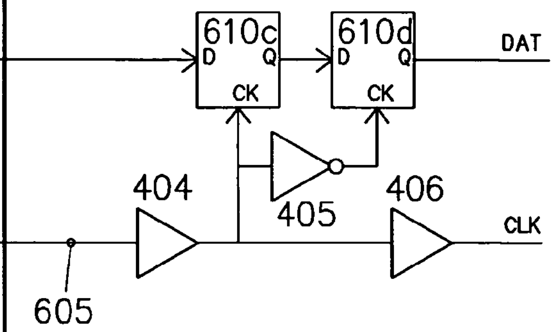
FIG. 5 is another illustrative diagram of the principle of delaying the data for half cycle according to the present invention.
Figure 6:
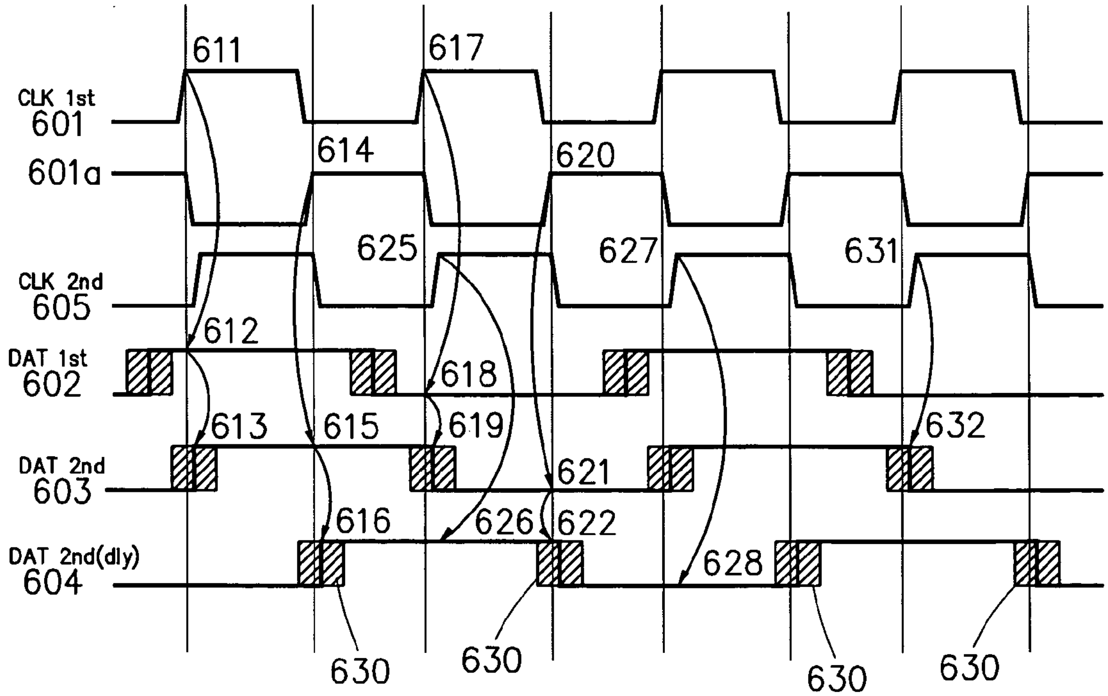
FIG. 6 is a timing diagram of the clocks as depicted in FIGS. 4 and 5.
Figure 7:
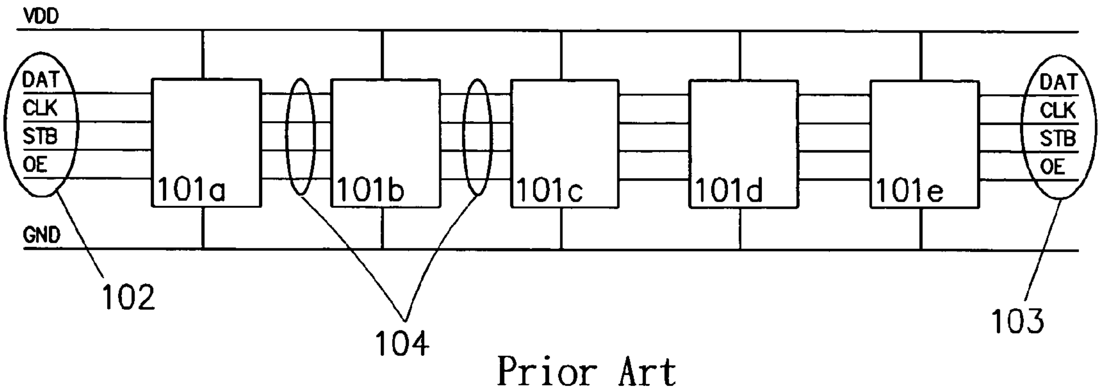
Prior Art Fig. 7
FIG. 7 is a block diagram of the method for connecting the LEDs according to the prior art.

FIGS. 4 to 6 illustrate the principle and significance of the principle of delaying the data for half cycle. The data latch 610*a* of the first device as shown in FIG. 4 latches the data 603 of the output DAT 602 of a previous set of latches at the positive edge 611 of the clock CLK 601, and the signal 614 drives the next glatch 610*b* to operate when the clock CLK 601 is inverted to 601*a* as to delay the output data 603 half cycle and becomes the next output 604. Therefore, the data latch 610*c* of the next device as shown in FIG. 5 is buffered, and the rising edges 620, 621, 622 of the clock 605 latches the output 604 of the previous device as shown in FIG. 4. For each input data, the latch 610*a*, 610*c* will latch the data after the data is stable and at the middle section before/after the data is changed. Therefore, such arrangement can assure a very accurate data DAT fetched by each clock CLK.

In the timing diagram as shown in FIG. 6, the shaded area is an unstable data area, and the cause for the unstable area resides on that each batch of ICs will output data DAT faster or slower than the output of clock CLK due to different manufacturing processes. Since each digital signal is either "0" or "1", a slope will be produced because the capacitors and resistors of the circuit are affected. Due to different manufacturing process, the internal latch 601*a*, 601*c* of each IC has a different voltage (approximately +/−20% VDD) for fetching data, which will also produce a timing difference.

As to the traditional design illustrated in FIG. 8, the output of the clock CLK and the data DAT have very close timing (within several nanoseconds or tens of nanoseconds). Once the ICs from different batches are connected, it is easy to generate data error, and such error has not much effect within the same circuit board, but when two different devices with a distance of over 100 mm apart, then the effect will become very large. For example, the data DAT 603 fetched by the clock CLK 605 of the timing 631, 632 as shown in FIGS. 4 to 6 falls into the unstable area and the correct data cannot be fetched 100%.

Further, the brightness control instruction for the brightness function originally controlled from the outside can be sent from a serial signal and processed by an internal logic circuit as to reduce another circuit OE as shown in FIG. 8. However, such technology is not special, and will not be described here.

In view of the description above, the control device in accordance with the present invention can greatly improve the system stability and lower the cost for the whole device. With the IC design, the volume can be greatly reduced, and thus the system with serially connected LED lamps should be the mainstream in the coming years.

What is claimed is:

1. A serially connected LED lamps control device comprising: a plurality of shift registers, and an LED driver circuit, an internal latch signal is used to produce a circuit to reduce the quantity of connections and a plurality of circuits capable of delaying an output data for half cycle as to improve the stability of a system, wherein said LED driver circuit comprises a D-type latch being installed in front of said data output for an inverted clock synchronization and capable of delaying an outputted data for half cycle, and a clock loss detect circuit added to said control device, such that when said data is sent and the clock is stopped for a predetermined time, said circuit automatically generates a latch signal, and said latch signal is obtained by a latch signal selector and set to another D-type latch to latch the output data from said original S-R shift register as to generate an LED control signal and said LED driver circuit drives said LED lamps, thereby a connecting line is reduced; wherein said latch signal select circuit adds a circuit flexibility such that a system designer selectively adopts a desired internal and external latch signal as needed.

* * * * *